3,145,191
EPOXY COMPOSITIONS

Bruno M. Perfetti, Wilkinsburg, Pa., assignor, by mesne assignments, to Mobil Finishes Company, Inc., New York, N.Y., a corporation of Delaware
No Drawing. Filed June 25, 1959, Ser. No. 822,755
11 Claims. (Cl. 260—47)

The present invention relates to resinous polyepoxides produced by simultaneous co-reaction of a polyhydric phenol, a polypropylene glycol having a molecular weight above about 150, preferably above 350 and up to about 2100 and epichlorihydrin in the presence of a critically controlled proportion of alkali, such as sodium hydroxide, whereby new and valuable aromatic polyglycidyl ethers are produced.

The invention is particularly directed to low viscosity polyepoxides produced as aforesaid using dihydric phenols, preferably a bisphenol, and polypropylene glycol having a molecular weight above 250, preferably above 350, whereby polyepoxides of unique characteristics including unusually low viscosity and exceptional plasticizing character are achieved.

Other and further objectives and advantages of the invention will be apparent from the description which follows.

In accordance with the invention, a mixture of polyhydric phenol, preferably dihydric phenol, and polypropylene glycol having a molecular weight above 150 and up to about 2100 is reacted with epichlorhydrin in the presence of a critically limited proportion of alkali in excess of the amount of alkali required to dehydrohalogenate the halohydrin produced by reaction of phenolic hydroxyl with epichlorhydrin.

The epichlorhydrin reactant is employed in an amount to provide at least 2.0 mol of epichlorhydrin per mol of phenolic hydroxyl. Preferably, and to achieve reaction products of desirable low viscosity, epichlorhydrin is used in an amount between 2.0 and 4.0 mol of epichlorhydrin per mol of phenolic hydroxyl. A further excess of epichlorhydrin is not harmful since this component provides a desirable reaction medium.

The course of the reaction is governed by the proportion of alkali which is employed. The minimum permissible proportion of alkali is 1.0 mol per mol of phenolic hydroxyl. Preferably, alkali is present in excess of at least 3% in order to avoid excessive proportions of unreacted aliphatic diol. The proportion of excess alkali preferably does not exceed 8% since this leads to a tendency to form gel particles in the reaction medium which necessitates filtration, loss of valuable product and change in the character of the product. The maximum proportion of alkali permissible varies somewhat depending upon the reactivity of the selected phenol and polyglycol and also with the reaction temperature and the rate of alkali addition. When more than 15% excess of alkali is used, gelation often results and such an excess must be avoided. With between 8 and 15% excess alkali, gelation is likely but can be avoided when a reactive phenol is used, e.g., bisphenol F, or when caustic addition is very slow.

At least 0.125 mol of polypropylene glycol is employed per mol of phenolic hydroxyl. Preferably from 0.2–0.5 mol of polypropylene glycol is employed per mol of phenolic hydroxyl. A greater proportion of polpropylene glycol may be used but the results are not quite as good and the proportion of unreacted polypropylene glycol which is present in the reaction product becomes large and this is wasteful.

The dihydric phenols which are preferably employed in accordance with the invention are desirably dinuclear such as bisphenol A, bisphenol F, biscresol A and p,p'-dihydroxybiphenyl. Mononuclear dihydric phenols such as resorcinol may also be used. Long chain bisphenols such as are shown in United States Patent 2,665,266 may also be used, a typical bisphenol of this type having the structure:

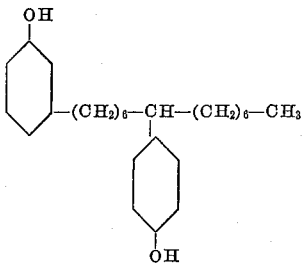

Unsymmetrical diphenylol methanes such as are shown in United States Patent 2,744,882 may also be used, a typical structure being:

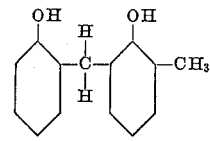

By reason of commercial availability and best performance, bisphenol A, bisphenol F and biscresol A are preferred.

Trihydric phenols such as trihydroxy diphenyl dimethyl methane may be used, but this is not preferred. Products produced from trihydric phenols in accordance with the invention in comparison with conventional polyglycidyl ethers of the same phenol cure to a more infusible condition and possess improved solubility and compatibility characteristics. However, the advantages achieved using trihydroxy phenols are not as numerous or as valuable as those which can be achieved using dihydric phenols.

Polypropylene glycols having a molecular weight above 350 are outstanding and lead to products of lowest viscosity and greatest plasticizing activity, polypropylene glycols having a molecular weight above 250 are particularly unique in providing minimum viscosity and relatively hard cured products possessing desirable pre-break yield properties.

Preferred products in accordance with the invention possess a viscosity measured at room temperature of less than 12,000 centipoises, preferably less than 2,000 centipoises. The products of the invention are characterized by a viscosity of less than 15,000 centipoises. Preferred products possess an epoxide value of at least 0.25 equivalents per 100 grams of resin and an epoxy equivalency of at least about 1.3.

Other polyalkylene glycols such as polyethylene glycol of various molecular weight (from 150–2000) may be employed in admixture with polypropylene glycol in an amount up to about 50% by weight based on the weight of the mixture. Further, admixtures with polypropylene glycol may include proportions of aliphatic diols such as propylene glycol, 1,5-pentanediol, 1,6-hexanediol, etc. in amounts up to about 30% by weight.

Interestingly, the present invention does not require the employment of polyglycols in which both of the hydroxy groups are primary groups. In this respect, the invention is to be distinguished from the use of aliphatic polyhydric material as a cross-linking reactant for pre-formed aromatic polyepoxide resins where it has been reported that at least two of the hydroxy groups of the polyhydric material should be primary groups.

Thus, the invention includes and achieves important advantage using commercial polypropylene glycol produced from propylene oxide in which the polypropylene glycol contains both primary hydroxyl groups and secondary hydroxyl groups.

Any strongly alkaline material capable of dehydrohalogenating a halohydrin may be employed. Alkali metal hydroxides such as sodium hydroxide are preferred. Strongly basic salts such as potassium carbonate may also be used.

The reaction products of the invention surprisingly are different from those produced by the mere cross-linking of preformed aromatic diepoxide with aliphatic glycol by reaction in the presence of alkali. Specifically, substantially increased fluidity, reactivity in certain curing reaction and compatibility with other resins are observed. From this it is concluded that the primary factor in the invention is not the cross-linking of aromatic diepoxide formed in the reaction with free glycol present in the system.

This conclusion is corroborated by the fact that glycol cross-linking in alkaline medium increases viscosity while the invention produces lower viscosity than can be achieved in pure bisphenol diepoxide monomer.

It is of interest to observe that the reaction products which are produced in accordance with the invention are generally of low hydrolyzable chlorine content despite the deficiency of alkali based on total hydroxyl available in the system.

The invention is illustrated in the following specific examples showing preferred reaction procedures.

EXAMPLE I

A mixture of 4.0 mols of epichlorhydrin, one mol of bisphenol A, and 0.5 mols of polypropylene glycol having an average molecular weight of 425 prepared by polymerizing 1,2 propylene oxide is stirred and heated to a refluxing temperature. Flake sodium hydroxide in a total amount of 5% excess based on phenolic hydroxyl (2.1 mols) is added to the mixture in three portions:

*Portion 1.*—One half of the alkali is added in small increments over a half-hour period; and the reaction is allowed to proceed at reflux for an additional one-half hour.

*Portion 2.*—One quarter of the alkali is added gradually over a fifteen minute period; and the reaction is allowed to proceed at reflux for an additional one-half hour.

*Portion 3.*—The remainder of the alkali is added gradually over a fifteen minute period; and the reaction is allowed to proceed at reflux for an additional hour.

The total reaction time, to this point, is about 3 hours.

The volatile phase of the mixture (unreacted epichlorhydrin and water) is then stripped off by distillation and the temperature of the mixture is gradually raised to about 175° C. over a two hour period. The mixture is then cooled to room temperature and washed three times with an equal volume of distilled water. The product is then vacuum-stripped to remove residual water and produce a clear, light-yellow syrup.

The reaction product prior to wash-washing has an epoxide value of 0.28–0.30 equivalent per 100 grams of resin and a viscosity of 800–1000 centipoises. By water-washing, 10–12% of the product is removed and the water soluble material is substantially free of epoxy group, containing only 0.01 equivalent per 100 grams of water extracted material. The water-washed product has an epoxide value of 0.30–0.32 equivalents per 100 grams of resin and a viscosity of 1200–1500 centipoises, viscosity being measured at room temperature. From 65–75% of the glycol used was combined into the water-insoluble portion of the product. The hydrolyzable chlorine content was 0.84%.

The alkali used in Example I need not be added as a solid, e.g., flake or powder. Instead, the alkali may be suspended in an inert solvent and added as a dispersion or dissolved in water and added as an aqueous solution. When alkali is added in water solution, it is preferred to remove the water to minimize any hydrolytic action. Thus, water may be removed as an azeotrope with epichlorhydrin during refluxing and the epichlorhydrin decanted and returned to the reaction mixture. When this is done, it is desirable to slow the rate of addition of caustic solution so that water is removed from the system as rapidly as it is introduced with the caustic solution. A simple water trap in the reflux equipment permits the foregoing to be accomplished.

EXAMPLE II

A mixture of epichlorhydrin (1850 grams), polypropylene glycol having an average molecular weight of 150 (375 grams) and bisphenol A (1140 grams) was charged to a reaction flask and was heated, with stirring, to a moderate reflux (pot temperature of 122° C.). A mixture of 76% flake caustic (420 grams) and distilled water (420 grams) was added slowly, in small increments, to the reaction solution. The rate of addition of the aqueous caustic was adjusted, to permit continuous removal of the water from the system by azeotropic distillation, to maintain a minimum water content in the reaction medium. When the addition of caustic was completed, the reaction mixture was refluxed until no more water was evolved. The excess epichlorhydrin was subsequently distilled from the product, at reduced pressure (25 mm. Hg); and the product temperature was gradually raised to 150° C. to insure complete removal of any volatile residues. The product was cooled to 100° C. and was diluted with toluene (1800 grams). The resulting saline slurry was filtered, to remove the sodium chloride by-product of the reaction. The toluene filtrate was distilled in vacuo, leaving a non-volatile resinous product 1826 grams) having an epoxide value of 0.41 equivalent per 100 grams of resin. The viscosity of the product was 10,400 centipoises at 80° F. The hydrolyzable chlorine content was 0.64%. When the product is water washed by simply agitating the product with an equal volume of water, about 8–10% is removed as water-soluble material. The water-soluble material has an epoxy value of 0.09 equivalent per 100 grams of material. The water-washed residue has an epoxide vaulune of 0.45 equivalent per 100 grams of resin and a viscosity of about 12,000 centipoises.

While the reaction is preferably performed at refluxing temperature, the temperature of reaction does not appear to be critical so long as the reaction is conducted for a period of time sufficient to consume substantialy all of the alkali in the system. For reasonable reaction periods, temperatures in excess of 60° C. are preferred. At higher temperatures the reaction proceeds more rapidly, and reflux temperatures are particularly convenient to use. On the other hand, the liquid phase reactions of the invention may be carried out at higher temperatures by using pressure to maintain the liquid phase of the reaction mixture.

The products of the invention may be used as produced, and without water-washing to remove unreacted polypropylene glycol. Indeed, the products of the invention possess an exceptional tolerance for the presence of free glycol or polyglycol. Water-washing to purify the product is preferred. At least 0.1 mol of polypropylene glycol per mol of phenolic hydroxyl is incorporated in the polyepoxide reaction product in a manner strongly resisting removal by water-washing, particularly in comparison with the ease of removal of glycol component by water-washing which is characteristic of a physical mixture of epoxy resin and polypropylene glycol.

The viscosity and epoxy value of water-washed products produced in accordance with the invention are set forth for purposes of comparison in Table I together with the properties of Epon 828, Epon 864, substantially pure bisphenol diepoxide monomer (D.E.R. 332, Dow) and diepoxide-glycol condensed product. Epon 828, Epon 864 and D.E.R. 332 are all diglycidyl ethers of bisphenol A and are further defined in Table I.

Table I

| Polyepoxide | Viscosity (cp.) | Epoxy value |
|---|---|---|
| (1) Epon 828 (mol. wt.=390) | 12,000–15,000 | 0.51–0.54 |
| (2) Epon 864 (mol. wt.=630) | Solid | 0.30–0.32 |
| (3) D.E.R. 332 | 6,400 | 0.56 |
| (4) Reaction product of Epon 828 (1.0 mol) and polypropylene glycol 425 (0.5 mol) in the presence of 0.5% KOH reacted at 150° C. for one hour | (1) | (1) |
| (5) Reaction product of Epon 828 (1.0 mol) and polypropylene glycol 425 (0.5 mol) in the presence of 0.25% KOH reacted at 150° C. for three hours | 114,000 | 0.19 |
| (6) Example I (0.5 mol polypropylene glycol 425 per mo. of bisphenol A) | 1,200–1,500 | 0.30–0.32 |
| (7) Example II (0.5 mol polypropylene glycol 150 per mol bisphenol A) | 12,000 | 0.45 |

[1] Insoluble gel.

In the above Table I, Epoxy Value is reported in equivalents per 100 grams of resin, item (4) is in accordance with the procedure set forth in United States Patent 2,731,444 and item (5) is similar to item (4) but run using a smaller concentration of alkali and a longer reaction period.

The surprising nature of the new result which is achieved may be gathered by comparing the similarity in the proportions of chemical components in items (5) and (6) in Table I. Thus, item (6) which represents the invention contains substantially the same proportion of bisphenol A, about 15%, more combined epichlorhydrin and about 20% less polypropylene glycol 425. Despite this broad stoichiometric similarity, the invention provides an epoxy value which is much higher and the product is a relatively thin liquid of viscosity 1,200–1,500 centipoises instead of a thick and unmanageable liquid of viscosity 114,000 centipoises.

The results shown in Table I are even more surprising when it is considered that Epon 828 is normally associated with products produced using a mol ratio of epichlorhydrin to bisphenol A of 10:1. In Example I this mol ratio is only 4:1, a mol ratio which, in the absence of the glycol component, would lead to the production of higher molecular weight solid products similar to Epon 864.

In brief, the present invention using proportions of epichlorhydrin to bisphenol which normally lead to relatively high viscosity aromatic polyepoxides and in the presence of a known cross-linking component which normally increases viscosity when it is used for cross-linking purposes and in the presence of an alkaline environment normally associated with the aforesaid cross-linking reaction; surprisingly produces an extremely low viscosity reaction product which is essentially a diepoxide.

The remarkable increase in fluidity which is obtained is an important attribute in high solids compositions such as potting, casting and patching compositions.

The products which are produced in accordance with the present invention do not correspond with those which may be obtained by simply physically admixing epoxy resin with a corresponding weight proportion of polyalkylene glycol. This is illustrated by the greater resistance of the polyalkylene glycol incorporated in the products of the invention to extraction by water-washing. Thus, the initially water-washed products produced in Example I and assuming no substantial reaction of PPG–425 with epoxy resin present would approximately correspond with a physical mixture of PPG–425 and Epon 828 in weight proportions of 65/35. Taking each of these systems and mixing them with an equal weight of water, the mixture may be tumbled for 20 hours at room temperature in order to cause the water-soluble polyglycol to be extracted from the water-insoluble epoxy components of the system into the water phase. After extraction, the aqueous phase is separated from the organic resinous phase and the proportion of polyglycol extracted determined.

The details of the procedure for determining the water-extractability of the epoxy-glycol systems are as follows: An aliquot (10 grams) of the aqueous phase was removed to an evaporating dish; and the water was evaporated, by exposing the surface of the solution to a stream of hot air. A control solution containing 10% (by weight) of the appropriate polyglycol was run, with the extraction sample, to monitor the determination by indicating any loss of polyglycol by volatiliztion from the water solution. Evaporation to approximately constant weight required 20–30 minutes. Under these conditions, polypropylene glycol 150 and 425 were essentially nonvolatile.

Determining water extraction as described above, it has been found that only 26.8% of the polypropylene glycol content is removed from the reaction product of Example I. In comparison, the possibly corresponding physical mixture lost 61.7% of its glycol content. Comparing the Example II product using polypropylene glycol 150, the condensate lost 19.4% glycol while an 82/18 physical mixture of Epon 828 and polypropylene glycol 150 lost 82.2% glycol. It is, therefore, established that the polyglycol component of the present condensates is bound up and forms part of the new epoxy resin which is produced by the invention and is not present in the form of a mere physical mixture with epoxy resin.

The reaction product of Example I has further been compared with corresponding physical mixtures after curing in the presence of aliphatic amine such as tetraethylene pentamine for 3 hours at 300° F. It is found that the product of Example I produces a cured casting which is very different from that produced by the physical mixture for the reason that the hard cured product obtained using the epoxy-polypropylene glycol condensate of Example I elongated over 100% of its original length prior to breakage. In contrast, the corresponding physical mixture only elongated about 27% of its original length prior to breakage and adjustment of hydrolyzable chlorine content for the purpose of making the physical mixture more closely approximate the product of Example I did not alter the vastly greater elongation of hard cured products made from the condensate in comparison with the physical mixture.

There is, accordingly, provided by the invention a polyepoxide possessing a high epoxy equivalency, e.g., 1.3, preferably about 2, and which can be used as a cross-linking agent while achieving cured products possessing increased capacity to yield upon application of physical force. Thus, the products of the invention may be used in the cure of a copolymer of butyl methacrylate and acrylic acid in weight proportions of 92–5 or similar copolymers containing styrene instead of butyl methacrylate.

The reaction products of the invention also provide superior adhesion to glass. Thus, using an epoxy-aliphatic amine adduct as curing agent in an amount of about 16% by weight, the product of Example I cemented glass blocks together more securely than the corresponding physical mixture. An increase in adhesion of about 25–35% is observed. In comparison, when the condensates of the invention are compared with Epon 828, the two products produce approximately equal adhesion. By employing the condensates of the invention, important advantage is achieved because of the lower viscosity which prevails in the products of the invention, this lower viscosity being of particular importance in providing an increased tolerance for mineral fillers.

The products of the invention possess certain advantageous and valuable properties not possessed by the conventional epoxy resins having an aromatic backbone while retaining the advantageous properties which have led to the economic acceptance of such conventional resins. Thus, epoxy resins are well known for use in coating compositions where they serve diverse purposes in combination with phenol-formaldehyde, melamine-formaldehyde and similar aminoplast resins or in thermosetting vinyl compositions. The conventional polyepoxides produced from bisphenol A such as Epon 828 and Epon 864 have poor flow and plate-wetting properties, and the solvent balance of the coating solution must be carefully adjusted to provide smooth and non-cratered films. The products of the invention possess improved flow and plate-wetting properties and greater latitude is permissible in solvent selection and proportion.

The reaction products of the invention possess equivalent to superior chemical reactivity and cure more completely to provide improved water resistance and films having improved flexibility and resistance to fabrication as will be evident from Table II.

*Table II*

| Polyepoxide | Compositions (parts by weight) | | | | | |
|---|---|---|---|---|---|---|
| | A | B | C | D | E | F |
| (1) Epon 828 | 10 | | | | | |
| (2) Reaction product Epon 828 (1.0) mol, polypropylene glycol 425 (0.5 mol) condensed at 150° F. in the presence of 0.25% KOH for 2 hours | | 10 | | | | |
| (3) 80/20 mixture by weight of Epon 828/butyl glycidyl ether | | | 10 | | | |
| (4) Example I | | | | 10 | | |
| (5) Example I without water-washing to remove unreacted polypropylene glycol 425 | | | | | | |
| Phenolic resin: Condensation product of equi-weight mixture of phenol and a o-cresol with aqueous formaldehyde using a mol ratio of a phenolic component to formaldehyde of 1/1.39 in the presence of ammonia | 10 | 10 | 10 | 10 | | 10 |
| Solvent (methyl ethyl ketone) | 10 | 10 | 10 | 10 | | 10 |
| Properties: | | | | | | |
| Dry adhesion | 10 | 10 | 2 | 10 | | 10 |
| Flexibility | 0 | 5 | 0 | 9 | | 9 |
| Process blush | 8 | 9 | 10 | 10 | | 10 |
| Adhesion after processing | 0 | 0–1 | 2 | 9–10 | | 10 |

NOTE.—The rating scale is on the basis of 0 to 10 with 10 being perfect and 0 complete failure.

The tests set forth in Table II were conducted by filming the composition upon electrolytic tinplate and baking at 375° F. for 10 minutes to provide a coating weight of substantially 5 milligrams per square inch. Processing was tested in distilled water at 250° F. for 90 minutes. Adhesion was tested by applying Scotch tape to a cross-hatched scored area and then pulling the tape away sharply. Flexibility was tested by a 180° bend.

As will be evident from Table II, the preferred compositions of the invention are uniquely superior to conventional epoxy resins, conventional epoxy resins cross-linked with the same glycol, and blends of conventional epoxy resins with aliphatic epoxide represented by butyl glycidyl ether. The corresponding physical mixture of conventional epoxy resin (Epon 828) with polypropylene glycol 425 produced a wet adhesion of 0 in the coating composition of Table II and hence is not comparable with the product of Example I.

The invention therefore provides a uniquely superior cure when the condensates of the invention are provided in admixture with heat-hardening condensation products of phenols, including alkyl phenols, with aldehydes (preferably formaldehyde) in an amount of at least 0.8 mol of aldehyde per mol of phenol.

The improved compatibility of the polypropylene glycol condensation products of the invention may be established by comparing Epon 828 with the product of Example I.

The improved compatibility which is achieved by the invention is demonstrated in Table III. The resins are combined in a 50/50 ratio in a mutual solvent, e.g., a solvent which will dissolve each of the resins completely in the absence of the other usually methyl ethyl ketone, toluol or mixtures thereof.

The films which are evaluated in the table had a weight of 3–5 milligrams per square inch and were deposited upon electrolytic tinplate after either drying one hour at room temperature or after baking ten minutes at 325° F. In the table, C designates a compatible clear film. PC designates a hazy, partially compatible film. I designates an incompatible cloudy film.

*Table III*

COMPATIBILITY OF SOLVENT SOLUTIONS OF EPOXY-POLYPROPYLENE GLYCOL CONDENSATE OF EXAMPLE I COMPARED WITH EPON 828 WITH VARIOUS OTHER RESINS AND POLYMERS

| Test resin or polymer | Epoxide resin | | | |
|---|---|---|---|---|
| | Example I | | Epon 828 | |
| chemical type of polymer (50/50 weight ratio named resin/epoxide resin) | Air-dry 1 hr. at RT | Baked 10 mins. at 325° F. | Air-dry 1 hr. at RT | Baked 10 mins. at 325° F. |
| Styrene-maleic anhydride | C | PC | C | I |
| Copolymer butyl methacrylate/acrylic acid 95/5 by weight | C | C | I | I |
| Polyacrylonitrile | I | PC | I | C |
| Poly-n-butylmethacrylate | C | C | I | I |
| Polyvinylbutyral | PC | C | I | I |
| ½ sec. nitrocellulose | C | C | C | PC |
| Ethyl cellulose | C | C | PC | C |
| Olefinic hydrocarbon | C | C | I | I |
| Pentaerythritol rosin ester | C | C | I | C |
| Hydrogenated rosin ester | C | C | I | C |

The increased compatibility of the Example I condensate over that of Epon 828, makes it of greater utility as a reactive plasticizer for cellulose resins, acrylic resins, certain vinyls and phenolics, and reactive hydrocarbon resins. Further its improved compatibility with rosin esters and alkyds indicates its potential value as an additive resin for introducing epoxide functionality into general line paints based on alkyd and rosin ester vehicles.

The invention is defined in the claims which follow.

I claim:

1. A method of producing resinous polyepoxides comprising co-reacting, in the liquid phase and in the presence of strong alkali, polyhydric phenol containing only phenolic hydroxyl groups with at least 0.125 mol of polyoxypropylene glycol per mol of phenolic hydroxyl and at least 2.0 mols of epichlorhydrin per mol of phenolic hydroxyl, said polyoxypropylene glycol having a molecular weight of at least about 150 up to about 2100 and said strong alkali being capable of dehydrohalogenating a halohydrin and being present at a concentration of from 1.0–1.15 mol per mol of phenolic hydroxyl.

2. A method as recited in claim 1 in which said polyhydric phenol is a dihydric phenol.

3. A method as recited in claim 1 in which said polyhydric phenol is a dihydric phenol and in which said epichlorhydrin is present in an amount in the range of 2.0–4.0 mols per mol of phenolic hydroxyl.

4. A method as recited in claim 2 in which said polyoxypropylene glycol is present in an amount of from 0.2–0.5 mol per mol of phenolic hydroxyl.

5. A method as recited in claim 4 in which said strong alkali is present in an amount of from 1.03–1.08 mol per mol of phenolic hydroxyl.

6. A method as recited in claim 2 in which said strong alkali is present in an amount of from 1.03–1.08 mol per mol of phenolic hydroxyl and is added to the reaction mixture incrementally, said reaction mixture being maintained in substantially anhydrous condition.

7. A method as recited in claim 6 in which said strong alkali is alkali metal hydroxide.

8. A method as recited in claim 1 in which the product of the said reaction is water-washed to remove water-soluble components.

9. A method as recited in claim 1 in which said polyhydric phenol is a dihydric phenol and in which the reaction is conducted at a temperature in excess of 60° C. and said reaction is continued until substantially all of said strong alkali in the reaction mixture is consumed.

10. A method as recited in claim 1 in which said polyhydric phenol is a dihydric phenol and in which the reaction is conducted by maintaining the reaction mixture at its refluxing temperature, the vapors generated being condensed and water removed from said condensate prior to returning the same to said reaction mixture.

11. The product of the method of claim 1.

References Cited in the file of this patent
UNITED STATES PATENTS

| | | |
|---|---|---|
| 2,538,072 | Zech | Jan. 16, 1951 |
| 2,642,412 | Newey et al. | June 16, 1953 |
| 2,872,432 | Metzger | Feb. 3, 1959 |
| 2,898,349 | Zuppinger et al. | Aug. 4, 1959 |